US009367742B2

(12) United States Patent
Lee et al.

(10) Patent No.: US 9,367,742 B2
(45) Date of Patent: Jun. 14, 2016

(54) APPARATUS AND METHOD FOR MONITORING OBJECT FROM CAPTURED IMAGE

(71) Applicant: SK TELECOM CO., LTD., Seoul (KR)

(72) Inventors: Hee-yul Lee, Daegu (KR); Young-gwan Jo, Seongnam-si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 14/634,618

(22) Filed: Feb. 27, 2015

(65) Prior Publication Data

US 2015/0169958 A1    Jun. 18, 2015

Related U.S. Application Data

(63) Continuation of application No. PCT/KR2013/007629, filed on Aug. 26, 2013.

(30) Foreign Application Priority Data

Aug. 31, 2012  (KR) ........................ 10-2012-0096805

(51) Int. Cl.
| | |
|---|---|
| G06K 9/00 | (2006.01) |
| G06T 7/20 | (2006.01) |
| G06K 9/46 | (2006.01) |
| G06K 9/48 | (2006.01) |
| G06K 9/62 | (2006.01) |
| H04N 7/18 | (2006.01) |
| H04N 5/225 | (2006.01) |

(52) U.S. Cl.
CPC ........ *G06K 9/00624* (2013.01); *G06K 9/00771* (2013.01); *G06K 9/4604* (2013.01); *G06K 9/48* (2013.01); *G06K 9/6201* (2013.01); *G06T 7/2053* (2013.01); *H04N 7/183* (2013.01)

(58) Field of Classification Search
CPC ............ G06K 9/00; H04N 7/00; H04N 21/00
USPC .......... 382/103, 107, 236; 348/169, 170, 171, 348/172, 352
See application file for complete search history.

(56) References Cited

U.S. PATENT DOCUMENTS

| | | | |
|---|---|---|---|
| 5,604,820 A * | 2/1997 | Ono ................... | G06K 9/00268 382/157 |
| 9,014,431 B2 * | 4/2015 | Fukuchi ............... | H04N 5/4403 382/103 |

FOREIGN PATENT DOCUMENTS

| | | |
|---|---|---|
| JP | 2012128877 A | 7/2012 |
| KR | 1020100023786 A | 3/2010 |
| KR | 1020120006593 A | 1/2012 |
| KR | 1020120025718 A | 3/2012 |
| KR | 1020120049636 A | 5/2012 |

OTHER PUBLICATIONS

International Search Report for PCT/KR2013/007629 dated Dec. 19, 2013.

* cited by examiner

*Primary Examiner* — Abolfazl Tabatabai
(74) *Attorney, Agent, or Firm* — Hauptman Ham, LLP (57) ABSTRACT

An object monitoring apparatus includes: an image receiver to receive at least one frame of captured images; an edge image generator to generate an edge image by detecting edges of objects appearing in the frame; a reference image generator to generate a reference image by detecting a part corresponding to a background in the frame to thereby define the detected part as a background edge; a candidate object extractor to extract one or more candidate object pixels by comparing the edge image with the reference image, and to extract a candidate object by grouping the extracted candidate object pixels into the candidate object; and an object-of-interest determiner to determine whether the candidate object is an object-of-interest based on a size of the candidate object and a duration time of detection of the candidate object.

17 Claims, 4 Drawing Sheets

APPARATUS AND METHOD FOR MONITORING OBJECT FROM CAPTURED IMAGE

CROSS-REFERENCE TO RELATED APPLICATION

The present application is a continuation of International Patent Application No. PCT/KR2013/007629, filed Aug. 26, 2013, which is based on and claims priority to Korean Patent Application No. 10-2012-0096805, filed on Aug. 31, 2012. The disclosures of the above-listed applications are hereby incorporated by reference herein in their entirety.

TECHNICAL FIELD

The present disclosure in one or more embodiments relates to an apparatus and method for monitoring an object from a captured image.

BACKGROUND

The statements in this section merely provide background information related to the present disclosure and do not constitute prior art.

In monitoring an object by using an image surveillance, changes in color of pixels are detected, and the pixels exhibiting changes in color are observed for a certain time and determined to be the pixels of an object which is stolen or left unattended, depending on gradient information.

However, color changes due to full or partial illumination (shading, turning on lights, and turning off lights) frequently occur in images monitored in real-time. The inventor(s) has noted that color-based image detection is likely to lead to an incorrect determination due to sensitive response to changes in illumination. The inventor(s) has noted that in addition to such issues as color changes by illumination, the detection speed is lowered since the determination of an object left unattended and theft are performed independent of extraction of candidate objects. Moreover, the inventor(s) has experienced that to utilize gradient information in determining such events as leaving an object unattended and theft, a calculation time is needed for extracting the gradient information as well as 3-dimensional color information, thereby making it difficult to implement real-time processing.

SUMMARY

In accordance with some embodiments of the present disclosure, an object monitoring apparatus comprises an image receiver, an edge image generator, a reference image generator, a candidate object extractor, and an object-of-interest determiner. The image receiver is configured to receive at least one frame of captured images. The edge image generator configured to generate an edge image by detecting edges of objects appearing in the frame. The reference image generator is configured to generate a reference image by detecting a part corresponding to a background in the frame to thereby define the detected part as a background edge, the reference image generated by repeatedly detecting as many as or more than a predetermined number an edge commonly appearing over a plurality of the frames. The candidate object extractor is configured to extract one or more candidate object pixels by comparing the edge image with the reference image, and to extract a candidate object by grouping the extracted candidate object pixels into the candidate object. And the object-of-interest determiner is configured to determine whether the candidate object is an object-of-interest based on a size of the candidate object and a duration time of detection of the candidate object.

In another aspect of the present disclosure, an object monitoring apparatus is configured to receive at least one frame of captured images, generate an edge image by detecting edges of objects appearing in the frame, generate a reference image by detecting a part corresponding to a background in the frame to thereby define the detected part as a background edge, the reference image generated by repeatedly detecting as many as or more than a predetermined number an edge commonly appearing over a plurality of the frames, extract a candidate object by comparing the edge image with the reference image, and determine whether the candidate object is an object-of-interest.

DETAILED DESCRIPTION

Hereinafter, at least one embodiment of the present disclosure will be described in detail with reference to the accompanying drawings. Some embodiments of the present disclosure has been made in an effort to provide an apparatus and method for monitoring an object from captured images by generating an edge image and a reference image based on the gradient information of a frame, setting an object-of-interest by comparing the edge image with the reference image, and monitoring such events as theft of the set object-of-interest and leaving the same unattended.

Figure 1:
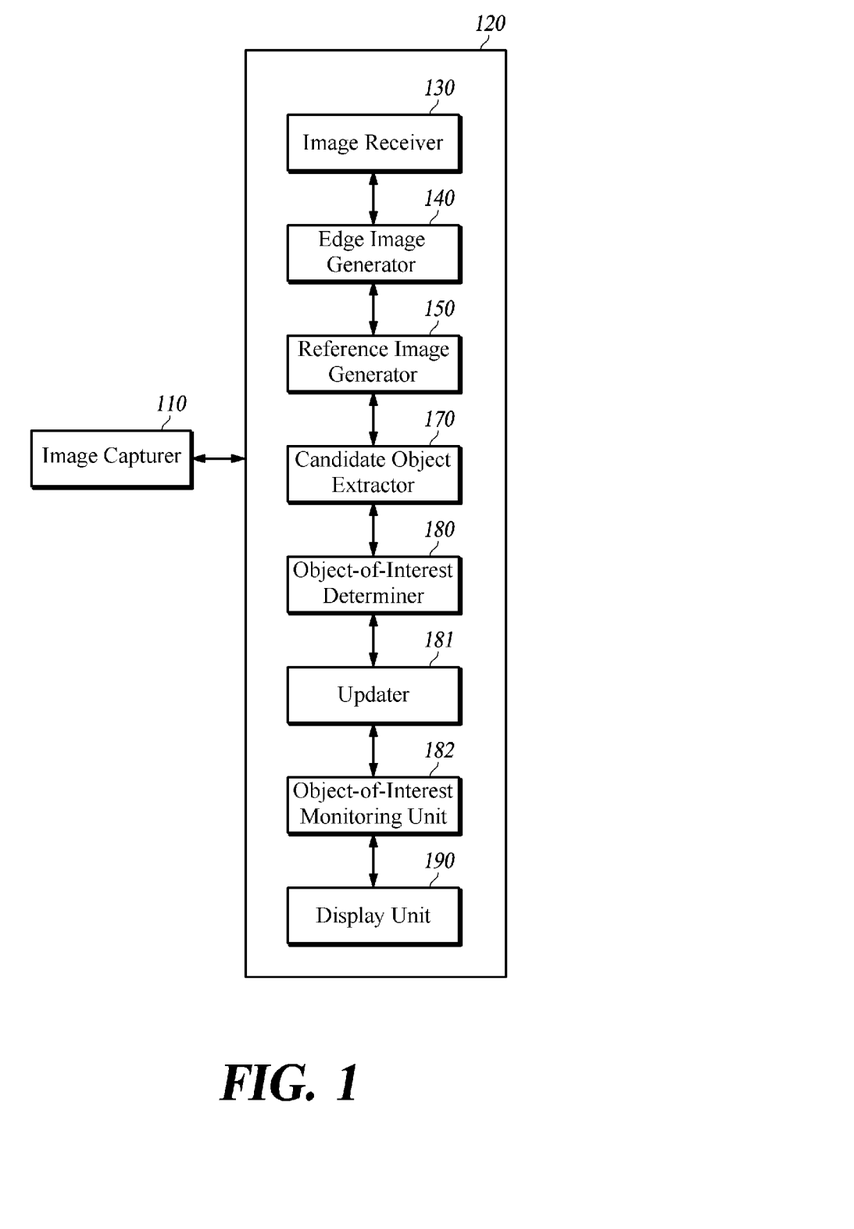
FIG. 1 is a schematic block diagram of a system for monitoring objects for theft and leaving unattended, according to at least one embodiment.

FIG. 1 is a schematic block diagram of a system for monitoring objects for theft or leaving unattended according to at least one embodiment of the present disclosure.

A system for monitoring objects according to one or more embodiments of the present disclosure (e.g., a security or surveillance video system) includes an image capturer 110 and an object monitoring apparatus 120. Herein, the object monitoring apparatus 120 includes an image receiver 130, an edge image generator 140, a reference image generator 150, a candidate object extractor 170, an object-of-interest determiner 180, an updater 181, an object-of-interest monitoring unit 182 and a display unit 190. Other components of the object monitoring apparatus 120, such as each of the image receiver 130, the edge image generator 140, the reference image generator 150, the updater 181, the candidate object extractor 170, and the object-of-interest determiner 180, the updater 181 and the object-of-interest monitoring unit 182 are implemented by, or includes, one or more processors and/or application-specific integrated circuits (ASICs). The system for monitoring objects comprises input units such as one or more buttons, a touch screen, a mic and so on, and output units such as a display, an indicator and so on.

The image capturer 110 refers to a device capable of capturing images. The image capturer 110 is implemented by a closed-circuit television (CCTV) camera, a video surveillance camera, and the like which are capable of capturing object-monitoring images to monitor objects for theft or leaving unattended. The image capturer 110 transmits captured images to the object monitoring apparatus 120 to monitor theft or abandoning. The images captured by the image capturer 110 include a plurality of frames.

The object monitoring apparatus 120 generates an edge image and a reference image, and extracts a detection candidate based on a relative difference calculated by respectively applying pixels of the edge image and pixels of the reference image to a predetermined function. In addition, the object monitoring apparatus 120 registers the extracted detection candidate as an object-of-interest according to a predetermined criteria and thereby monitors an event such as theft and leaving an object unattended.

Hereinafter, a more detailed description will be given for elements included in the object monitoring apparatus 120 according to one or more embodiments of the present disclosure.

The image receiver 130 receives at least one frame of a plurality of frames of captured images from the image capturer 110 which is connected to the object monitoring apparatus 120. Herein, the frame is a frame captured (or selected) from the captured images (herein, the images compose a complete moving picture or one or more still images), but is not limited thereto. The frame is one or more still images among the many still images which compose the complete moving picture. The frame is one or more frames selected from among a plurality of received frames.

The edge image generator 140 generates an edge image by detecting edges of the objects appearing in the frame by using (calculating) gradients of pixels of the frame to thereby define the detected edges of the objects as the edge image. Herein, the gradient information is a value generated from differences between neighboring pixels, and represents the sum of absolute values of the differences. The gradient information also relates to an image gradient which is a directional change in the intensity or color in an image. The edges refer to object boundaries in the frame as expressed with the gradient information.

The reference image generator 150 generates a reference image by detecting a part corresponding to the background in the frame to thereby define the detected part as a background edge. Herein, the reference image is generated by detecting edges of the objects appearing in a preset image as a background edge or by repeatedly detecting as many as or more than a predetermined number an edge commonly appearing over a plurality of frames as a background edge by comparing the frames.

The candidate object extractor 170 extracts candidate object pixels by comparing the edge image with the reference image. And the candidate object extractor 170 groups a plurality of extracted candidate object pixels into a candidate object.

The candidate object extractor 170 calculates a relative difference (RD) by applying pixels of the edge image and pixels of the reference image to a predetermined function (i.e., Equation 1), and determines the pixels having the RD as pixels of the candidate object when the RD is maintained above a predetermined threshold for a preset time period. And then the candidate object extractor 170 extracts the determined pixels of the candidate object from pixels of the edge image and of the reference image. Herein, the preset time period is meant to be set so as not to have a candidate object extracted from an object exhibiting movement between frames by a comparison between the edge image and the reference image. Herein, the RD is proportional to the square of the differences between pixels of the edge image and of the reference image and is inversely proportional to a maximum value of the pixels of the edge image and of the reference image.

An example of calculating the RD for extracting candidate object pixels by comparing the pixels of the edge image and of the reference image is represented as Equation 1.

$$RD = \frac{(A - B)^2}{\max(A, B)} \qquad \text{Equation 1}$$

Herein, RD denotes a relative difference, A denotes a pixel value of the edge image, and B denotes a pixel value of the reference image.

Firstly assuming a threshold for extraction of candidate object pixels is 2, the pixel value of the edge image is 10 pixels, and the pixel value of the reference image is 6 pixels, the candidate object extractor 170 yields 1.6 as the RD when the first assumption is applied to Equation 1. Since the RD of the result of 1.6 is less than the threshold of 2, the candidate object extractor 170 determines that no candidate object pixel is present in the corresponding image frame. Secondly assuming that the threshold for extraction of a candidate object pixel is given as 2, the edge image is of 10 pixels, and the reference image is of 4 pixels, the RD becomes 3.6 when the second assumption is applied to Equation 1. Since the RD of the result of 3.6 is greater than the threshold of 2 in this case, the candidate object extractor 170 determines that the pixels having the RD of the result of 3.6 corresponds to candidate object pixels when the threshold exceedance of the RD is maintained for the preset time.

The candidate object extractor 170 also groups a plurality of pixels determined to be the candidate object pixels, into a candidate object. Herein, the candidate object extractor 170 groups a plurality of candidate object pixels having an RD maintained above a predetermined threshold for the preset time into a candidate object.

The object-of-interest determiner 180 determines a candidate object to be the object-of-interest when the candidate object has an edge exhibiting no change in the grouped candidate object for longer than a predetermined time period and has a size greater than a preset size. On the other hand, when the candidate object has an edge exhibiting change in the grouped candidate object for longer than the predetermined time period and has a size less than the preset size, the object-of-interest determiner 180 determines the edge to be a background edge of the reference image and updates the reference image through the updater 181.

The updater 181 updates the candidate object determined to be the background edge by the object-of-interest determiner 180 into the reference image. Herein, updating means adding or cancelling only changed parts (i.e., changed pixels in the frame) upon comparing the reference image generated by the reference image generator 150 with the candidate object determined to be the background edge.

An object-of-interest monitoring unit 182 registers the candidate object determined by the object-of-interest determiner 180 as the object-of-interest, and measures a duration time of the presence of the object-of-interest in the captured image starting from the time when the object-of-interest is registered. When measured duration time reaches a preset time, the object-of-interest monitoring unit 182 recognizes (determines) that an event of theft or leaving unattended has occurred, and generates an event signal (e.g., a theft signal or an abandonment signal). Herein, the event is a theft or the occurrence of an unattended object, and is applied to any fields of detecting an object-of-interest. The preset time is input and set by a user through input unit(s) of the object monitoring apparatus 120. For example, when the function of monitoring an unattended object is used for monitoring a parking violation, the time is set to, for example, 5 minutes such that an abandonment signal is generated for a vehicle left unoccupied at the same location for more than the 5 minute-limit. When employing the theft function for the purpose of monitoring theft of a work of art at an art gallery, the time is set to, for example, 3 seconds for generating a theft signal therefor when the work of art becomes absent for more than 3 seconds.

In detecting an event such as theft or abandonment, assuming A represents a pixel value for an edge image and B is a pixel value for a reference image, the object-of-interest monitoring unit 182 detects an event such as theft or leaving an object unattended by using a distribution of edges of an object-of-interest through combinations of the values of A−B for a plurality of pixels corresponding to the region of the object-of-interest.

New pixels (hereinafter, added pixels) are added by the object-of-interest monitoring unit 182 to the reference image when the differences between pixels of the edge image and pixels of the reference image are greater than 0 (A−B>0). Pixels in the reference image are cancelled (hereinafter, cancelled pixels) by the object-of-interest monitoring unit 182 when the differences between the pixels of the edge image and of the reference image are less than 0 (A−B<0). For example, when the object-of-interest monitoring unit 182 monitors an event of abandonment, the added pixels appear on the periphery of the object in the reference image, and cancelled pixels appear at the center of the object occluding the existing background edge. When the object-of-interest monitoring unit 182 detects an event of theft, it presents the added pixels in the reference image at the center of the object occluding the reference image and presents the cancelled pixels of the lost object on the periphery of the object to thereby appear the cancelled pixels on the reference image.

In detecting an event such as theft or abandonment based on the differences between pixels of the edge image and pixels of the reference image, the object-of-interest monitoring unit 182 detects an event such as theft or abandonment by using a sum of weights which are distances from a center of the object-of-interest. For example, when the object-of-interest monitoring unit 182 detects an event of abandonment, it determines that the object has been left unattended from a positive sum of weights which are distances from the center of the object-of-interest as it determines that the pixels (added pixels) presented on the periphery of the object are spaced a long distance from the region of the object-of-interest, and the number of the added pixels is greater than that of the deleted pixels (cancelled pixels).

An example of finding the sum of weights which are distances from the center of the object-of-interest is represented as Equation 2.

$$\sum_{P \in ROI} d(P) \times RD(P) \times \text{type}$$ Equation 2

Herein, P is an added or cancelled pixel, d(P) is a distance between pixel P and the center of the object-of-interest, RD(P) is a relative difference of pixel values at pixel P in the edge image and in the reference image, type is +1 when P is an added pixel and type is −1 when P is a cancelled pixel, and region of intereste (ROI) is a region of the object-of-interest.

The display unit 190 receives an event signal (e.g., a theft signal, and an abandonment signal) generated according to the preset time by the object-of-interest monitoring unit 182, marks the object-of-interest (with, for example, a circle, a rectangle, etc.) and outputs the same to display the marked object-of-interest on a display panel of the display unit 190.

Figure 2:
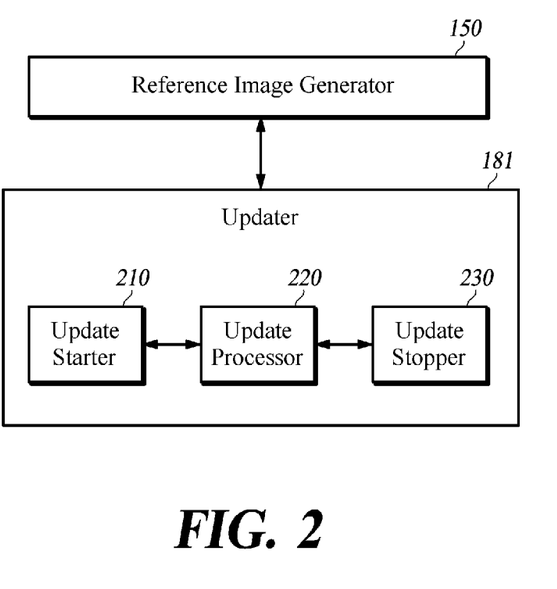
FIG. 2 is a schematic block diagram of an updater for updating a reference image in an object monitoring apparatus according to at least one embodiment.

FIG. 2 is a schematic block diagram of an updater for updating a reference image in an object monitoring apparatus according to at least one embodiment of the present disclosure.

The updater 160 according to one or more embodiments of the present disclosure includes an update starter 210, an update processor 220 and an update stopper 230. Other components of the updater 160, such as each of the update starter 210, the update processor 220 and the update stopper 230 are implemented by, or includes, one or more processors and/or application-specific integrated circuits (ASICs). The updater 160 comprises input units such as one or more buttons, a touch screen, a mic and so on, and output units such as a display, an indicator and so on.

Once the candidate object is determined to be a background by the object-of-interest determiner 180, the update starter 210 transmits an initialization signal to the reference image generator 150 to update the reference image. While the update starter 210 is illustrated as updating the reference image according to the determination of the object-of-interest determiner 180, embodiments of the present disclosure are not limited thereto. When a change in the preset background region is detected by comparing the edge image with the reference image, the update starter 210 updates the reference image through the update processor 220.

The update processor 220 updates the reference image. Herein, the update processor 220 updates only changed edges (i.e., pixels corresponding to corresponding edges changed in the reference image) by comparing the candidate object determined to be the background edge with the reference image, or updates all edges of candidate objects. Also, the update processor 220 may generate a reference image by resetting the edge.

Once updating of the reference image ends, the update stopper 230 transmits an update complete signal to the reference image generator 150 such that the reference image generator 150 extracts a candidate object by using the updated reference image.

Figure 3:
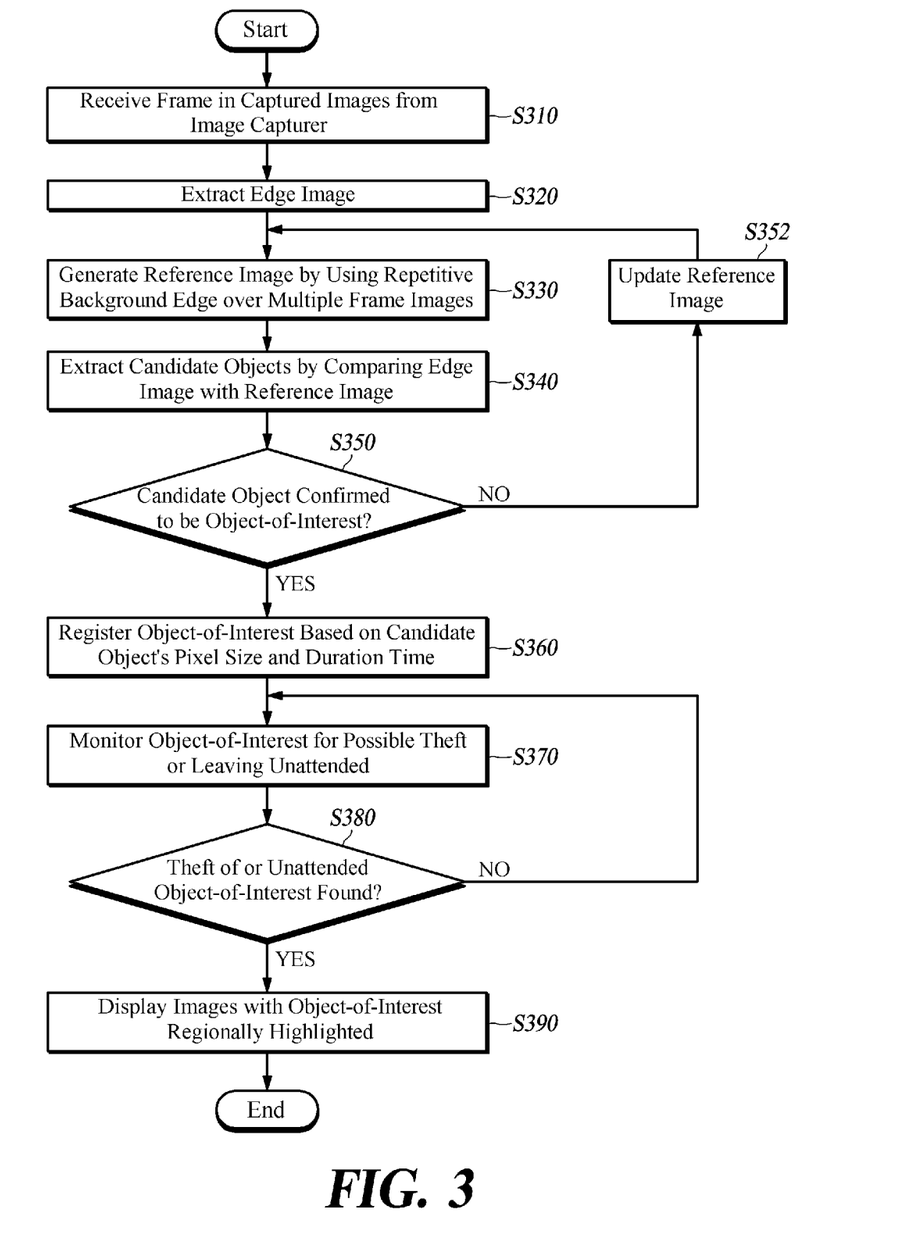
FIG. 3 is a flowchart of a method for monitoring objects for theft and leaving unattended, according to at least one embodiment.

FIG. 3 is a flowchart of a method for monitoring objects for a theft and abandonment, according to at least one embodiment.

The object monitoring apparatus 120 receives at least one frame of a plurality of frames of images captured by the image capturer 110 (S310). Herein, the frame is a frame captured (or selected) from the captured images (herein, the images compose a complete moving picture or one or more still images), but is not limited thereto. The frame is one or more still images among the many still images which compose the complete moving picture. The frame is one or more frames selected from among a plurality of received frames.

The object monitoring apparatus 120 generates an edge image by detecting edges of the objects appearing in the frame by using (calculating) gradients of pixels (S320).

The object monitoring apparatus 120 generates a reference image by detecting repeats of an edge appearing over a plurality of the frames as a background edge (S330). That is, the object monitoring apparatus 120 generates a reference image by detecting a part corresponding to the background in the frame to thereby define the detected part as the background edge. The object monitoring apparatus 120 generates the reference image by detecting edges of the objects appearing in a preset image as the background edge or by repeatedly detecting as many as or more than a predetermined number an edge commonly appearing over a plurality of frames as a background edge by comparing the frames.

When the reference image does not need to be updated, the object monitoring apparatus 120 extracts a candidate object by comparing the edge image with the reference image and grouping different edge portions between the images (S340). The object monitoring apparatus 120 calculates an RD by applying pixels of the edge image and pixels of the reference image to a predetermined function (i.e., Equation 1), and determines the pixels having the RD as candidate object pixels when the RD is maintained above a predetermined threshold for a preset time. And then the object monitoring apparatus 120 extracts the determined pixels of the candidate object from pixels of the edge image and of the reference image. In addition, the object monitoring apparatus 120 groups a plurality of candidate object pixels having an RD maintained above a predetermined threshold for a preset time into a candidate object.

The object monitoring apparatus 120 determines whether or not the candidate object extracted in step S340 is the object-of-interest by using a predetermined criteria (S350). When the candidate object is not the object-of-interest, the object monitoring apparatus 120 determines that the candidate object is a background edge of the reference image and updates the reference image (S352). Herein, the object monitoring apparatus 120 determines that the candidate object is not the object-of-interest when the candidate object has an edge exhibiting no change in the grouped candidate object for longer than a predetermined time period and has a size less than the preset size.

When it is determined in Step S350 that the candidate object is the object-of-interest since the candidate object has an edge exhibiting no change in the grouped candidate object for longer than a predetermined time period and has a size greater than the preset size, the object monitoring apparatus 120 registers the candidate object as the object-of-interest (S360).

The object monitoring apparatus 120 monitors the object-of-interest for an event such as theft and abandonment (S370). When an event such as theft and abandonment occurs with respect to the object-of-interest (S380), the object monitoring apparatus 120 displays a region of the object-of-interest with the region highlighted with, for example, a circle or a rectangle (S390).

Although steps S310 to S390 of FIG. 3 have been described as being sequentially performed, this is only an exemplary description of the technical idea of at least one embodiment of the present disclosure. Those skilled in the art will appreciate that various modifications, additions and substitutions are possible, without departing from the characteristics of at least one embodiment of the disclosure. For example, the order of steps shown in FIG. 3 may be changed, or one or more of steps S310 to S390 may be performed in parallel. Therefore, the present disclosure is not limited to the time-series order as shown in FIG. 3.

Figure 4:
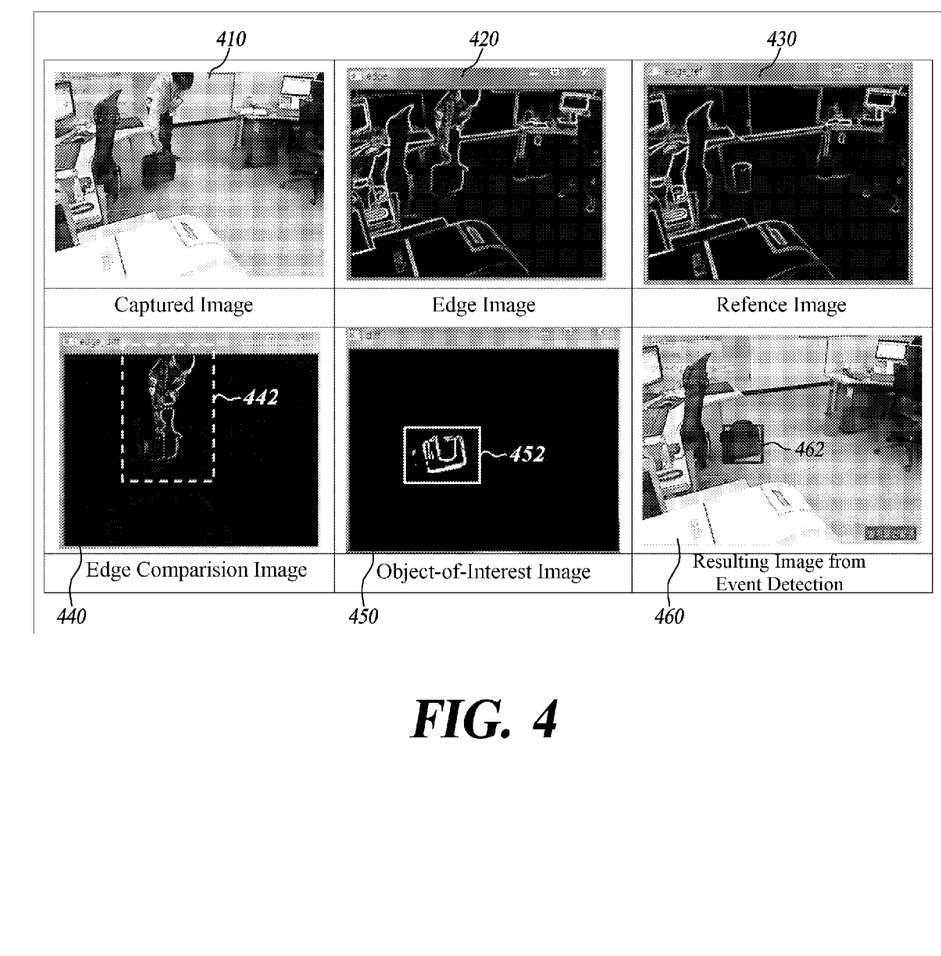
FIG. 4 is a diagram of an example operation of an object monitoring apparatus according to at least one embodiment.

FIG. 4 is a drawing of an example of an operation of an object monitoring apparatus according to at least one embodiment.

The captured image 410 is an image captured by the image capturer 110. The captured image 410 shows a person leaving a bag behind in an empty room.

The edge image 420 is an image generated by the object monitoring apparatus 120 by detecting edges of a plurality of objects appearing in the frame of the captured image 410 as an edge by using the gradient information.

The reference image 430 is an image generated by detecting a part corresponding to the background in the frame to thereby define the detected part as a background edge. Herein, the reference image is generated by detecting edges of the objects in a preset area as a background edge or by repeatedly detecting as many as or more than a predetermined number an edge commonly appearing over a plurality of frames as a background edge by comparing the frames.

The edge comparison image 440 is an image generated by extracting a candidate object 442 by comparing the edge image 420 with the reference image 430. Herein, in order to extract the candidate object 442 appearing in the edge comparison image 440, the object monitoring apparatus 120 calculates an RD by applying pixels of the edge image 420 and pixels of the reference image 430 to a predetermined function (i.e., Equation 1), and determines the pixels having the RD to be pixels of the candidate object 442 when the RD is maintained above a predetermined threshold for a preset time.

The object-of-interest image 450 is an image generated by determining and extracting an object-of-interest 452 from the candidate object 442 based on a predeterminedcriteria. Herein, the object monitoring apparatus 120 determines the candidate object 442 to be the object-of-interest 452, when the edge of the candidate object 442 has pixels exhibiting no change in value differences for longer than a predetermined time period and has a size greater than a preset size.

The resulting image of event detection 460 is an image output with an event result 462 highlighted when an event occurs with respect to the object-of-interest 452. Herein, the object monitoring apparatus 120 measures a duration time of the object-of-interest 452 to continuously appear on the captured image. When the measurement of the duration time reaches a preset time, the object monitoring apparatus 120 determines that the event such as theft and abandonment has occurred and output the event result 462 to the monitor with the event result 462 highlighted (with, for example, a circle, a rectangle, etc.).

According to some embodiments of the present disclosure as described above, an edge image and a reference image are generated based on gradient information of frames, an object-of-interest is set by comparing the edge image and the reference image, the set object-of-interest is monitored for theft or leaving unattended. This reduces errors resulting from change of illumination (e.g., shading, turning on lights, turning off lights), which occurs when the object-of-interest is detected using color information, and the object-of-interest is detected more quickly and accurately by using the edge information.

As exemplary embodiments of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have been described not for restricting the technical idea of the exemplary embodiments but for the sake of brevity and clarity. Accordingly, one of ordinary skill would understand that the scope of the claimed invention is not limited by the explicitly described above embodiments but by the claims and equivalents thereof.

What is claimed is:

1. An object monitoring apparatus, comprising:
   an image receiver configured to receive at least one frame of captured images;
   an edge image generator configured to generate an edge image by detecting edges of objects appearing in the frame;
   a reference image generator configured to generate a reference image by detecting a part corresponding to a background in the frame to thereby define the detected part as a background edge, the reference image generated by repeatedly detecting as many as or more than a predetermined number an edge commonly appearing over a plurality of the frames;
   a candidate object extractor configured to extract one or more candidate object pixels by comparing the edge image with the reference image, and to extract a candidate object by grouping the extracted candidate object pixels into the candidate object; and
   an object-of-interest determiner configured to determine whether the candidate object is an object-of-interest based on a size of the candidate object and a duration time of detection of the candidate object.

2. The object monitoring apparatus of claim 1, further comprising:
   an updater configured to update the candidate object into the reference image when the object-of-interest determiner determines that the candidate object is not the object-of-interest.

3. The object monitoring apparatus of claim 2, wherein the updater is configured to update the candidate object into the reference image, when the candidate object has pixels exhibiting no change in value differences for longer than a predetermined time period and has a size less than a preset size.

4. The object monitoring apparatus of claim 1, further comprising:
   a display unit configured to output the captured images with the object-of-interest regionally highlighted in response to an event.

5. The object monitoring apparatus of claim 1, wherein the candidate object extractor is configured to extract the candidate object pixels based on a relative difference between pixels of the edge image and pixels of the reference image.

6. The object monitoring apparatus of claim 5, wherein the relative difference is in proportion to the square of differences between the pixels of the edge image and the pixels of the reference image and is in inverse proportion to a maximum value of the pixels of the edge image and of the reference image.

7. The object monitoring apparatus of claim 6, wherein the candidate object extractor is operative, when the relative difference is maintained above a predetermined threshold for longer than a preset time, to extract the candidate object pixels and group the extracted candidate object pixels into the candidate object.

8. The object monitoring apparatus of claim 1, wherein the edge image generator is configured to detect the edges by using gradient information of the frame.

9. The object monitoring apparatus of claim 1, further comprising:
   an object-of-interest monitoring unit configured to register the candidate object as the object-of-interest and determine an event to be present or absent, when the candidate object has pixels exhibiting no change in value differences for longer than a predetermined time period and has a size greater than a preset size.

10. The object monitoring apparatus of claim 9, wherein the object-of-interest monitoring unit is configured to measure a duration time of the object-of-interest in the captured images starting from the time when the object-of-interest is registered, and determine the event to be present when measurement of the duration time amounts to a preset time.

11. The object monitoring apparatus of claim 9, wherein the object-of-interest monitoring unit is configured to generate an edge of the object-of-interest by combining a plurality of added pixels and a plurality of cancelled pixels, the added pixels and the cancelled pixels being generated by using differences between pixels of the edge image and of the reference image.

12. The object monitoring apparatus of claim 11, wherein
   the added pixels are presented when the differences between the pixels of the edge image and of the reference image are greater than 0,
   the cancelled pixels are presented when the differences between the pixels of the edge image and of the reference image are smaller than 0, and
   the object-of-interest monitoring unit is operative to monitor the event in a theft surveillance for presenting the added pixels in the reference image centrally of the object-of-interest occluding the reference image and for presenting the cancelled pixels peripherally of the object-of-interest.

13. The object monitoring apparatus of claim 12, wherein the object-of-interest monitoring unit is configured to monitor the event with respect to the object-of-interest with a sum of weights which are distances from a center of the object-of-interest to the added pixels and to the cancelled pixels, wherein the sum of the weights is calculated by applying the following Equation:

$$\sum_{P \in ROI} d(P) \times RD(P) \times \text{type}$$

where
P is an added or cancelled pixel,
d(P) is a distance between pixel P and the center of the object-of-interest,
RD(P) is a relative difference of pixel values at pixel P in the edge image and in the reference image,
type is +1 when P is an added pixel and type is −1 when P is a cancelled pixel, and
ROI is a region of the object-of-interest.

14. A method performed by an object monitoring apparatus, the method comprising:
   receiving at least one frame of captured images;
   generating an edge image by detecting edges of objects appearing in the frame;
   generating a reference image by detecting a part corresponding to a background in the frame to thereby define the detected part as a background edge, the reference image generated by repeatedly detecting as many as or more than a predetermined number an edge commonly appearing over a plurality of the frames;
   extracting a candidate object by comparing the edge image with the reference image; and
   determining whether the candidate object is an object-of-interest.

15. The method of claim 14, wherein the extracting of the candidate object comprises:

extracting one or more candidate object pixels based on a relative difference calculated by comparing the edge image with the reference image, and extracting the candidate object by grouping the extracted candidate object pixels into the candidate object.

16. The method of claim 14, wherein the determining of whether the candidate object is the object-of-interest comprises determining the candidate object to be the object-of-interest, when the candidate object has pixels exhibiting no change in value differences for longer than a predetermined time period and has a size greater than a preset size.

17. The method of claim 14, further comprising:

registering the candidate object as the object-of-interest and thereby monitoring whether an event is present or absent, when the candidate object is determined to be the object-of-interest; and outputting the captured images with the object-of-interest regionally highlighted, when the monitoring determines the event to be present.

\* \* \* \* \*